US011640647B2

(12) United States Patent
Gruber

(10) Patent No.: US 11,640,647 B2
(45) Date of Patent: May 2, 2023

(54) METHODS AND APPARATUS FOR INTRA-WAVE TEXTURE LOOPING

(71) Applicant: QUALCOMM Incorporated, San Diego, CA (US)

(72) Inventor: Andrew Evan Gruber, Arlington, MA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/191,439

(22) Filed: Mar. 3, 2021

(65) Prior Publication Data
US 2022/0284537 A1 Sep. 8, 2022

(51) Int. Cl.
*G06T 1/20* (2006.01)
*G06F 9/48* (2006.01)
*G06T 15/00* (2011.01)

(52) U.S. Cl.
CPC .............. *G06T 1/20* (2013.01); *G06F 9/4843* (2013.01); *G06T 15/005* (2013.01)

(58) Field of Classification Search
CPC combination set(s) only.
See application file for complete search history.

(56) References Cited

U.S. PATENT DOCUMENTS

| 7,542,043 | B1 | 6/2009 | Lindholm et al. | |
|---|---|---|---|---|
| 9,799,094 | B1* | 10/2017 | Chen | G06T 1/20 |
| 2015/0095914 | A1* | 4/2015 | Mei | G06F 9/522 |
| | | | | 718/102 |
| 2018/0165092 | A1 | 6/2018 | Du et al. | |
| 2018/0308195 | A1* | 10/2018 | Vembu | G06T 1/20 |
| 2020/0081748 | A1* | 3/2020 | Johnson | G06F 9/3887 |
| 2020/0293368 | A1* | 9/2020 | Andrei | G06F 9/4881 |
| 2020/0336726 | A1* | 10/2020 | Wang | H04N 19/70 |
| 2021/0157600 | A1* | 5/2021 | Dejanovic | G06F 9/3887 |
| 2022/0124335 | A1* | 4/2022 | Dinu | H04N 19/159 |

OTHER PUBLICATIONS

Anonymous: "Understanding GPU Caches", Jan. 25, 2021 (Jan. 25, 2021), pp. 1-18, XP55918019, Retrieved from the Internet: URL: https://www.rastergrid.com/blog/gpu-tech/2021/01/understanding-gpu-caches/ [retrieved on May 4, 2022] the whole document.
International Search Report and Written Opinion—PCT/US2022/015336—ISA/EPO —dated May 13, 2022.

(Continued)

*Primary Examiner* — Sing-Wai Wu
*Assistant Examiner* — Khoa Vu
(74) *Attorney, Agent, or Firm* — Procopio, Cory, Hargreaves & Savitch LLP

(57) ABSTRACT

The present disclosure relates to methods and devices for graphics processing including an apparatus, e.g., a GPU. The apparatus may determine whether to divide a group of threads into a plurality of sub-groups of threads, each thread of the group of threads being associated with a shader program. The apparatus may also divide, upon determining to divide the group of threads into the plurality of sub-groups of threads, the group of threads into the plurality of sub-groups of threads. Additionally, the apparatus may execute, upon dividing the group of threads into the plurality of sub-groups of threads, a subsection of the shader program for each sub-group of threads of the plurality of sub-groups of threads.

34 Claims, 7 Drawing Sheets

(56) References Cited

OTHER PUBLICATIONS

Kim H., et al., "Compiler-Assisted GPU Thread Throttling for Reduced Cache Contention", Proceedings of the 48th International Conference on Parallel Processing, ICPP2019, ACM Press, New York, USA, Aug. 5, 2019 (Aug. 5, 2019), 10 Pages, XP058456133, DOI: 10.1145/3337821.3337886ISBN:978-1-4503-6295-5 section 4.3.

Yoon M.K, et al., "DRAW: Investigating Benefits of Adaptive Fetch Group Size on GPU", 2015 IEEE International Symposium On Performance Analysis OF Systems and Software (ISPASS), IEEE, Mar. 29, 2015 (Mar. 29, 2015), pp. 183-192, XP032771528, DOI: 10.1109/ISPASS.2015.7095804 [retrieved on Apr. 27, 2015] section III.

* cited by examiner

METHODS AND APPARATUS FOR INTRA-WAVE TEXTURE LOOPING

TECHNICAL FIELD

The present disclosure relates generally to processing systems and, more particularly, to one or more techniques for graphics processing.

INTRODUCTION

Computing devices often perform graphics and/or display processing (e.g., utilizing a graphics processing unit (GPU), a central processing unit (CPU), a display processor, etc.) to render and display visual content. Such computing devices may include, for example, computer workstations, mobile phones such as smartphones, embedded systems, personal computers, tablet computers, and video game consoles. GPUs are configured to execute a graphics processing pipeline that includes one or more processing stages, which operate together to execute graphics processing commands and output a frame. A central processing unit (CPU) may control the operation of the GPU by issuing one or more graphics processing commands to the GPU. Modern day CPUs are typically capable of executing multiple applications concurrently, each of which may need to utilize the GPU during execution. A display processor is configured to convert digital information received from a CPU to analog values and may issue commands to a display panel for displaying the visual content. A device that provides content for visual presentation on a display may utilize a GPU and/or a display processor.

A GPU of a device may be configured to perform the processes in a graphics processing pipeline. Further, a display processor or display processing unit (DPU) may be configured to perform the processes of display processing. However, with the advent of wireless communication and smaller, handheld devices, there has developed an increased need for improved graphics or display processing.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a graphics processing unit (GPU) or any apparatus that can perform graphics processing. The apparatus may determine whether to divide a group of threads into a plurality of sub-groups of threads, each thread of the group of threads being associated with a shader program. The apparatus may also determine whether successive instructions of a set of instructions for the group of threads are associated with a same surface. Moreover, the apparatus may divide, upon determining to divide the group of threads into the plurality of sub-groups of threads, the group of threads into the plurality of sub-groups of threads. The apparatus may also insert a loop marker for each of the plurality of sub-groups of threads based on the subsection of the shader program. Additionally, the apparatus may execute, upon dividing the group of threads into the plurality of sub-groups of threads, a subsection of the shader program for each sub-group of threads of the plurality of sub-groups of threads, where the subsection of the shader program may complete execution for one sub-group of threads before commencing execution for a subsequent sub-group of threads. The apparatus may also store, in the cache, the memory footprint of the subsection of the shader program for each of the plurality of sub-groups of threads.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
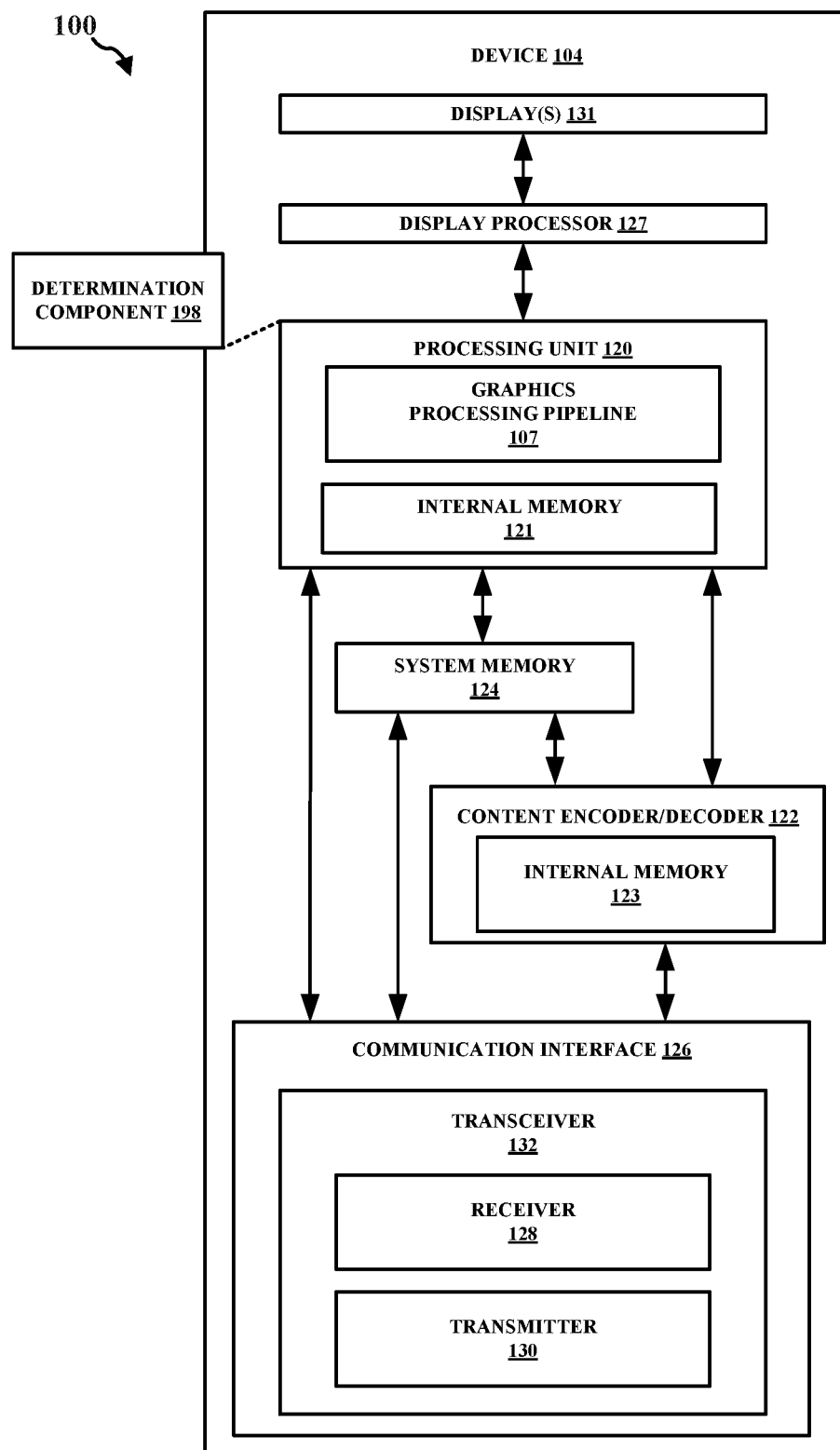
FIG. 1 is a block diagram that illustrates an example content generation system in accordance with one or more techniques of this disclosure.

In graphics processing, certain types of shading or texture instructions may fetch data that utilizes a certain amount of cache lines. Ideally, the amount of cache lines used for a shading or texture instruction execution may be less than a size of a cache. However, the size of a corresponding cache may not be large enough to hold all of the fetched data for the shading or texture instruction, so previously fetched data may be overwritten. As such, the next instruction may not be able to utilize some of the data that was fetched by previous instructions. So previously fetched data in a cache may not be reused by subsequent instructions, which may result in the data being fetched from the system memory, rather than from the cache. Accordingly, subsequent instructions may not be able to utilize previously fetched data. For instance, executing the full wave for a single texture fetch instruction may lead to inefficient texture cache usage and cache thrashing, such as data for the following texture fetch instruction being overwritten by the current texture fetch instruction. Aspects of the present disclosure may execute a portion of a texture fetch operation prior to executing the entire texture fetch operation. By doing so, aspects of the present disclosure may more efficiently utilize MIP maps and neighboring pixels may not be spread out in texture space. Aspects of the present disclosure may also provide an efficient texture cache usage and reduce the amount of cache misses or cache thrashing. Further, aspects of the present disclosure may allow subsequent texture instructions to be able to utilize previously fetched data at a cache, such as without the need to fetch the data from a system memory. As such, aspects of the present disclosure may reduce or mitigate the amount of times certain data, e.g., texture data, is fetched from system memory, i.e., even with a small cache size. Moreover, aspects of the present disclosure may provide a looping mechanism across multiple texture fetch instructions that work on a portion of a wave during each loop iteration. Accordingly, aspects of the present disclosure may utilize hardware-assisted texture looping that is controlled by a compiler or graphics shader.

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, networks, and transmission protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, graphics processing units (GPUs), general purpose GPUs (GPGPUs), central processing units (CPUs), application processors, digital signal processors (DSPs), reduced instruction set computing (RISC) processors, systems-on-chip (SOC), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software can be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise. The term application may refer to software. As described herein, one or more techniques may refer to an application, i.e., software, being configured to perform one or more functions. In such examples, the application may be stored on a memory, e.g., on-chip memory of a processor, system memory, or any other memory. Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

Accordingly, in one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

In general, this disclosure describes techniques for having a graphics processing pipeline in a single device or multiple devices, improving the rendering of graphical content, and/or reducing the load of a processing unit, i.e., any processing unit configured to perform one or more techniques described herein, such as a GPU. For example, this disclosure describes techniques for graphics processing in any device that utilizes graphics processing. Other example benefits are described throughout this disclosure.

As used herein, instances of the term "content" may refer to "graphical content," "image," and vice versa. This is true regardless of whether the terms are being used as an adjective, noun, or other parts of speech. In some examples, as used herein, the term "graphical content" may refer to a content produced by one or more processes of a graphics processing pipeline. In some examples, as used herein, the term "graphical content" may refer to a content produced by a processing unit configured to perform graphics processing. In some examples, as used herein, the term "graphical content" may refer to a content produced by a graphics processing unit.

In some examples, as used herein, the term "display content" may refer to content generated by a processing unit configured to perform displaying processing. In some examples, as used herein, the term "display content" may refer to content generated by a display processing unit. Graphical content may be processed to become display content. For example, a graphics processing unit may output graphical content, such as a frame, to a buffer (which may be referred to as a framebuffer). A display processing unit may read the graphical content, such as one or more frames from the buffer, and perform one or more display processing techniques thereon to generate display content. For example, a display processing unit may be configured to perform composition on one or more rendered layers to generate a frame. As another example, a display processing unit may be configured to compose, blend, or otherwise combine two or more layers together into a single frame. A display processing unit may be configured to perform scaling, e.g., upscaling or downscaling, on a frame. In some examples, a frame may refer to a layer. In other examples, a frame may refer to two or more layers that have already been blended together to form the frame, i.e., the frame includes two or more layers, and the frame that includes two or more layers may subsequently be blended.

FIG. 1 is a block diagram that illustrates an example content generation system 100 configured to implement one or more techniques of this disclosure. The content generation system 100 includes a device 104. The device 104 may include one or more components or circuits for performing various functions described herein. In some examples, one or more components of the device 104 may be components of an SOC. The device 104 may include one or more components configured to perform one or more techniques of this disclosure. In the example shown, the device 104 may include a processing unit 120, a content encoder/decoder 122, and a system memory 124. In some aspects, the device 104 can include a number of optional components, e.g., a communication interface 126, a transceiver 132, a receiver 128, a transmitter 130, a display processor 127, and one or more displays 131. Reference to the display 131 may refer to the one or more displays 131. For example, the display 131 may include a single display or multiple displays. The display 131 may include a first display and a second display. The first display may be a left-eye display and the second display may be a right-eye display. In some examples, the first and second display may receive different frames for presentment thereon. In other examples, the first and second display may receive the same frames for presentment thereon. In further examples, the results of the graphics processing may not be displayed on the device, e.g., the first and second display may not receive any frames for presentment thereon. Instead, the frames or graphics processing results may be transferred to another device. In some aspects, this can be referred to as split-rendering.

The processing unit 120 may include an internal memory 121. The processing unit 120 may be configured to perform graphics processing, such as in a graphics processing pipeline 107. The content encoder/decoder 122 may include an internal memory 123. In some examples, the device 104 may include a display processor, such as the display processor 127, to perform one or more display processing techniques on one or more frames generated by the processing unit 120 before presentment by the one or more displays 131. The display processor 127 may be configured to perform display processing. For example, the display processor 127 may be configured to perform one or more display processing techniques on one or more frames generated by the processing unit 120. The one or more displays 131 may be configured to display or otherwise present frames processed by the display processor 127. In some examples, the one or more displays 131 may include one or more of: a liquid crystal display (LCD), a plasma display, an organic light emitting diode (OLED) display, a projection display device, an augmented reality display device, a virtual reality display device, a head-mounted display, or any other type of display device.

Memory external to the processing unit 120 and the content encoder/decoder 122, such as system memory 124, may be accessible to the processing unit 120 and the content encoder/decoder 122. For example, the processing unit 120 and the content encoder/decoder 122 may be configured to read from and/or write to external memory, such as the system memory 124. The processing unit 120 and the content encoder/decoder 122 may be communicatively coupled to the system memory 124 over a bus. In some examples, the processing unit 120 and the content encoder/decoder 122 may be communicatively coupled to each other over the bus or a different connection.

The content encoder/decoder 122 may be configured to receive graphical content from any source, such as the system memory 124 and/or the communication interface 126. The system memory 124 may be configured to store received encoded or decoded graphical content. The content encoder/decoder 122 may be configured to receive encoded or decoded graphical content, e.g., from the system memory 124 and/or the communication interface 126, in the form of encoded pixel data. The content encoder/decoder 122 may be configured to encode or decode any graphical content.

The internal memory 121 or the system memory 124 may include one or more volatile or non-volatile memories or storage devices. In some examples, internal memory 121 or the system memory 124 may include RAM, SRAM, DRAM, erasable programmable ROM (EPROM), electrically erasable programmable ROM (EEPROM), flash memory, a magnetic data media or an optical storage media, or any other type of memory.

The internal memory 121 or the system memory 124 may be a non-transitory storage medium according to some examples. The term "non-transitory" may indicate that the storage medium is not embodied in a carrier wave or a propagated signal. However, the term "non-transitory" should not be interpreted to mean that internal memory 121 or the system memory 124 is non-movable or that its contents are static. As one example, the system memory 124 may be removed from the device 104 and moved to another device. As another example, the system memory 124 may not be removable from the device 104.

The processing unit 120 may be a central processing unit (CPU), a graphics processing unit (GPU), a general purpose GPU (GPGPU), or any other processing unit that may be configured to perform graphics processing. In some examples, the processing unit 120 may be integrated into a motherboard of the device 104. In some examples, the processing unit 120 may be present on a graphics card that is installed in a port in a motherboard of the device 104, or may be otherwise incorporated within a peripheral device configured to interoperate with the device 104. The processing unit 120 may include one or more processors, such as one or more microprocessors, GPUs, application specific integrated circuits (ASICs), field programmable gate arrays (FPGAs), arithmetic logic units (ALUs), digital signal processors (DSPs), discrete logic, software, hardware, firmware, other equivalent integrated or discrete logic circuitry, or any combinations thereof. If the techniques are implemented partially in software, the processing unit 120 may store instructions for the software in a suitable, non-transitory computer-readable storage medium, e.g., internal memory 121, and may execute the instructions in hardware using one or more processors to perform the techniques of this disclosure. Any of the foregoing, including hardware, software, a combination of hardware and software, etc., may be considered to be one or more processors.

The content encoder/decoder 122 may be any processing unit configured to perform content decoding. In some examples, the content encoder/decoder 122 may be integrated into a motherboard of the device 104. The content encoder/decoder 122 may include one or more processors, such as one or more microprocessors, application specific integrated circuits (ASICs), field programmable gate arrays (FPGAs), arithmetic logic units (ALUs), digital signal processors (DSPs), video processors, discrete logic, software, hardware, firmware, other equivalent integrated or discrete logic circuitry, or any combinations thereof. If the techniques are implemented partially in software, the content encoder/decoder 122 may store instructions for the software in a suitable, non-transitory computer-readable storage medium, e.g., internal memory 123, and may execute the instructions in hardware using one or more processors to perform the techniques of this disclosure. Any of the foregoing, including hardware, software, a combination of hardware and software, etc., may be considered to be one or more processors.

In some aspects, the content generation system 100 can include an optional communication interface 126. The communication interface 126 may include a receiver 128 and a transmitter 130. The receiver 128 may be configured to perform any receiving function described herein with respect to the device 104. Additionally, the receiver 128 may be configured to receive information, e.g., eye or head position information, rendering commands, or location information, from another device. The transmitter 130 may be configured to perform any transmitting function described herein with respect to the device 104. For example, the transmitter 130 may be configured to transmit information to another device, which may include a request for content. The receiver 128 and the transmitter 130 may be combined into a transceiver 132. In such examples, the transceiver 132 may be configured to perform any receiving function and/or transmitting function described herein with respect to the device 104.

Referring again to FIG. 1, in certain aspects, the processing unit 120 may include a determination component 198 configured to determine whether to divide a group of threads into a plurality of sub-groups of threads, each thread of the group of threads being associated with a shader program. The determination component 198 may also be configured to determine whether successive instructions of a set of instructions for the group of threads are associated with a same surface. The determination component 198 may also be configured to divide, upon determining to divide the group of threads into the plurality of sub-groups of threads, the group of threads into the plurality of sub-groups of threads. The determination component 198 may also be configured to insert a loop marker for each of the plurality of sub-groups of threads based on the subsection of the shader program. The determination component 198 may also be configured to execute, upon dividing the group of threads into the plurality of sub-groups of threads, a subsection of the shader program for each sub-group of threads of the plurality of sub-groups of threads, where the subsection of the shader program may complete execution for one sub-group of threads before commencing execution for a subsequent sub-group of threads. The determination component 198 may also be configured to store, in the cache, the memory footprint of the subsection of the shader program for each of the plurality of sub-groups of threads. Although the following description may be focused on graphics processing, the concepts described herein may be applicable to other similar processing techniques.

As described herein, a device, such as the device 104, may refer to any device, apparatus, or system configured to perform one or more techniques described herein. For example, a device may be a server, a base station, user equipment, a client device, a station, an access point, a computer, e.g., a personal computer, a desktop computer, a laptop computer, a tablet computer, a computer workstation, or a mainframe computer, an end product, an apparatus, a phone, a smart phone, a server, a video game platform or console, a handheld device, e.g., a portable video game device or a personal digital assistant (PDA), a wearable computing device, e.g., a smart watch, an augmented reality device, or a virtual reality device, a non-wearable device, a display or display device, a television, a television set-top box, an intermediate network device, a digital media player, a video streaming device, a content streaming device, an in-car computer, any mobile device, any device configured to generate graphical content, or any device configured to perform one or more techniques described herein. Processes herein may be described as performed by a particular component (e.g., a GPU), but, in further embodiments, can be performed using other components (e.g., a CPU), consistent with disclosed embodiments.

GPUs can process multiple types of data or data packets in a GPU pipeline. For instance, in some aspects, a GPU can process two types of data or data packets, e.g., context register packets and draw call data. A context register packet can be a set of global state information, e.g., information regarding a global register, shading program, or constant data, which can regulate how a graphics context will be processed. For example, context register packets can include information regarding a color format. In some aspects of context register packets, there can be a bit that indicates which workload belongs to a context register. Also, there can be multiple functions or programming running at the same time and/or in parallel. For example, functions or programming can describe a certain operation, e.g., the color mode or color format. Accordingly, a context register can define multiple states of a GPU.

Context states can be utilized to determine how an individual processing unit functions, e.g., a vertex fetcher (VFD), a vertex shader (VS), a shader processor, or a geometry processor, and/or in what mode the processing unit functions. In order to do so, GPUs can use context registers and programming data. In some aspects, a GPU can generate a workload, e.g., a vertex or pixel workload, in the pipeline based on the context register definition of a mode or state. Certain processing units, e.g., a VFD, can use these states to determine certain functions, e.g., how a vertex is assembled. As these modes or states can change, GPUs may need to change the corresponding context. Additionally, the workload that corresponds to the mode or state may follow the changing mode or state.

Figure 2:
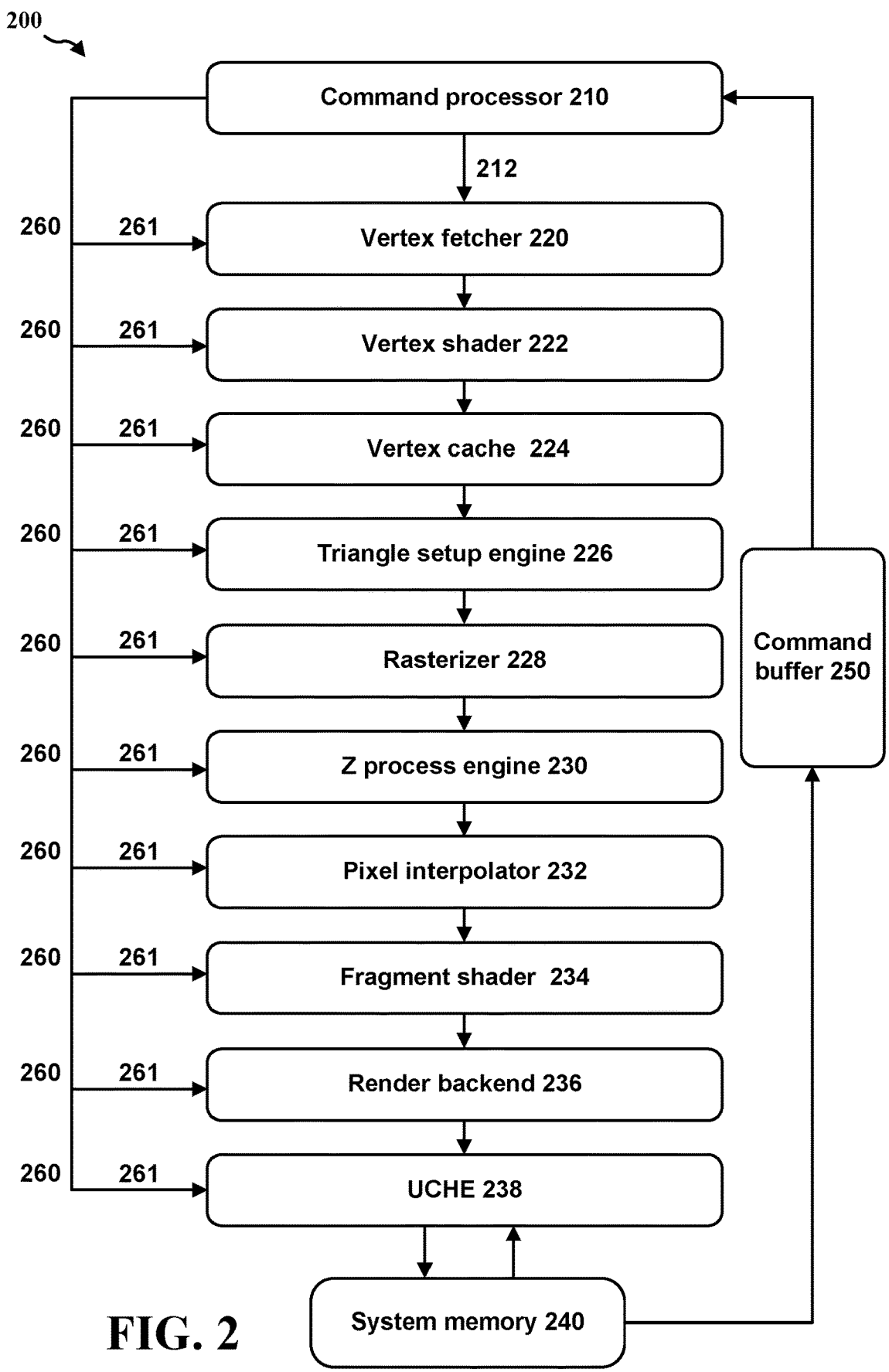
FIG. 2 illustrates an example GPU in accordance with one or more techniques of this disclosure.

FIG. 2 illustrates an example GPU 200 in accordance with one or more techniques of this disclosure. As shown in FIG. 2, GPU 200 includes command processor (CP) 210, draw call packets 212, VFD 220, VS 222, vertex cache (VPC) 224, triangle setup engine (TSE) 226, rasterizer (RAS) 228, Z process engine (ZPE) 230, pixel interpolator (PI) 232, fragment shader (FS) 234, render backend (RB) 236, level 2 (L2) cache (UCHE) 238, and system memory 240. Although FIG. 2 displays that GPU 200 includes processing units 220-238, GPU 200 can include a number of additional processing units. Additionally, processing units 220-238 are merely an example and any combination or order of processing units can be used by GPUs according to the present disclosure. GPU 200 also includes command buffer 250, context register packets 260, and context states 261.

As shown in FIG. 2, a GPU can utilize a CP, e.g., CP 210, or hardware accelerator to parse a command buffer into context register packets, e.g., context register packets 260, and/or draw call data packets, e.g., draw call packets 212. The CP 210 can then send the context register packets 260 or draw call data packets 212 through separate paths to the processing units or blocks in the GPU. Further, the command buffer 250 can alternate different states of context registers and draw calls. For example, a command buffer can be structured in the following manner: context register of context N, draw call(s) of context N, context register of context N+1, and draw call(s) of context N+1.

Some types of graphics processing units (GPUs) may utilize graphics shaders to access or fetch different textures. For instance, some types of graphics shaders may access multiple textures in one or more groups of pixels. Graphics shaders may also utilize different texture fetch operations, e.g., Texture_Fetch, in order to access multiple textures in a single group of pixels. For example, graphics shaders may utilize the following operations: (1) Texture_Fetch R0.xyzw←Texture(i1,j1,Tex1); and (2) Texture_Fetch R1.xyzw←Texture(i2,j2,Tex2). In some instances, a 'material' fetch may be followed by a fetch into a light texture or a cube-map texture. Also, GPUs may include a separate cache associated with these textures, e.g., a texture cache.

Additionally, some types of GPUs may execute single instruction/multiple data (SIMD) operations, such as with SIMD vectors. In some instances, a SIMD vector may be referred to as a wave, a wave operation, a warp, or a warp operation. A wave may be a group of pixels that are executed in lock-step via a series of instructions. This wave or warp may correspond to a width of a SIMD vector. For example, a typical wave size for a SIMD vector may include a number of threads or pixels, e.g., between 32 and 128 threads or pixels. Some architecture may also utilize a lower amount of threads or pixels, e.g., 16 threads or pixels. These threads or pixels may operate in lock-step, such that a single instruction may be executed for each thread or pixel.

In aspects of graphics processing, multum in parvo (MIP) (i.e., "much in little") maps or mipmaps, such as pyramids, are sequences of images for representing images or the resolution of images. Each mipmap in a sequence may be a pre-determined or optimized image, which may be a progressively lower resolution representation of a previous image. For instance, the height and/or width of each image, i.e., level, in a mipmap may be a certain amount, e.g., a power of two, smaller than a previous level. Mipmaps are associated with a number of intended benefits, such as increasing rendering speed and/or reducing aliasing artifacts. For instance, high resolution mipmap images may be used for high density samples, e.g., objects that appear close to a camera, while lower resolution images may be used for lower density samples, e.g., objects that appear farther away from the camera.

In some aspects, the process of mipmapping may result in the mapped pixels being close to one another, i.e., no more than a texture apart in texture space. By doing so, when a wave is executed, the texture pixels, i.e., texels, resulting from the wave may be localized, such that the locality may be within a single instruction. So multiple texels may be stored in a cache simultaneously, which may result in a suitable hit rate at the cache, e.g., a texture cache. When moving to the next instruction, a different texture may be utilized, so there may be no need to reuse textures.

Aspects of MIP mapping may ensure that a wave footprint in a texture space is similar in size to a pixel footprint in a screen space. For instance, the texture area for one wave may fit easily into a number of cache lines (e.g., two cache lines) which may result in a similar amount of cache 'misses' (e.g., two misses), i.e., when fetched data is overwritten or thrown out of the cache due to subsequent fetches. Additionally, a subsequent texture fetch may be from a different surface and may use different cache lines (i.e., possibly causing the previous cache lines to be evicted).

Some aspects of graphics processing may fully execute one texture fetch operation followed by another texture fetch operation, such as to avoid cache thrashing. For instance, in a common MIP mapped texture fetch situation, a full wave (e.g., a 64 or 128 pixel wave) of texture fetches may be executed before moving to the next texture fetch instruction, as neighboring pixels in the wave may be localized in a texture space. For example, a certain instruction (Texture_Fetch R0.xyzw←Texture(i1,j1,Tex1)) may be fully executed prior to fully executing another instruction (Texture_Fetch R1.xyzw←Texture(i2,j2,Tex2)).

Figure 3:
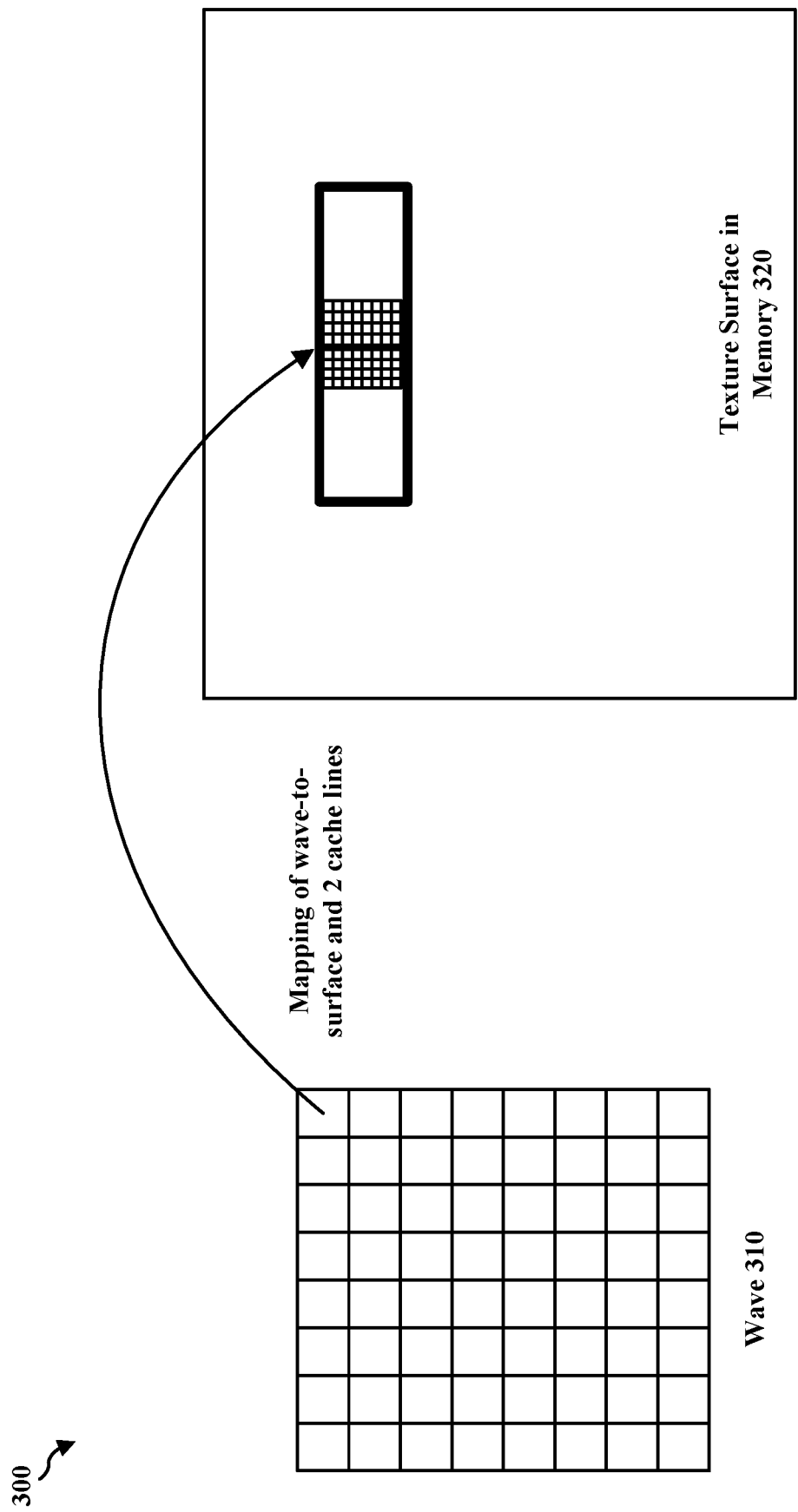
FIG. 3 is a diagram illustrating a mapping process for graphics processing in accordance with one or more techniques of this disclosure.

FIG. 3 is a diagram 300 illustrating a mapping process for graphics processing including mapping a wave to a texture surface in memory. As shown in FIG. 3, diagram 300 includes wave 310, e.g., a 64-pixel wave, and texture surface 320, e.g., corresponding to two cache lines. More specifically, FIG. 3 illustrates a mapping of wave 310 to texture surface 320 and two cache lines. As shown in FIG. 3, some types of graphics shaders, e.g., graphics shaders used for post-processing, may utilize successive fetches to the same texture surface. In these types of graphics shaders, MIP mapping may not be utilized. For instance, as shown in FIG. 3, a single wave may map to a very large area that may not fit into a local cache.

Some downsampling operations may utilize a number of texture fetch operations that are related to the size of the downsampling operation. For example, a 4×4 downsampling operation may utilize 16 texture fetch instructions: (1) Texture_Fetch R0.xyzw←Texture(i1,j1,Tex1); (2) Texture_Fetch R1.xyzw←Texture (i1+1,j1,Tex1); ... (16) Texture Fetch R15.xyzw←Texture(i1+3,j1+3, Tex1). These types of downsampling operations, e.g., downsampling for a filtering operation, may have a high amount of cache hits moving between successive instructions. This may be true if the entire footprint from the first instruction fits into the cache. If the cache holds a limited number of lines, e.g., 16 lines, there may be a high amount of cache misses, i.e., when fetched data is overwritten or thrown out of the cache due to subsequent fetches. When this occurs, the data may need to be fetched from main memory, which results in more traffic from main memory and an increased memory bandwidth. So there are texture instructions that may need a higher amount of cache size than is capable at a cache.

Figure 4:
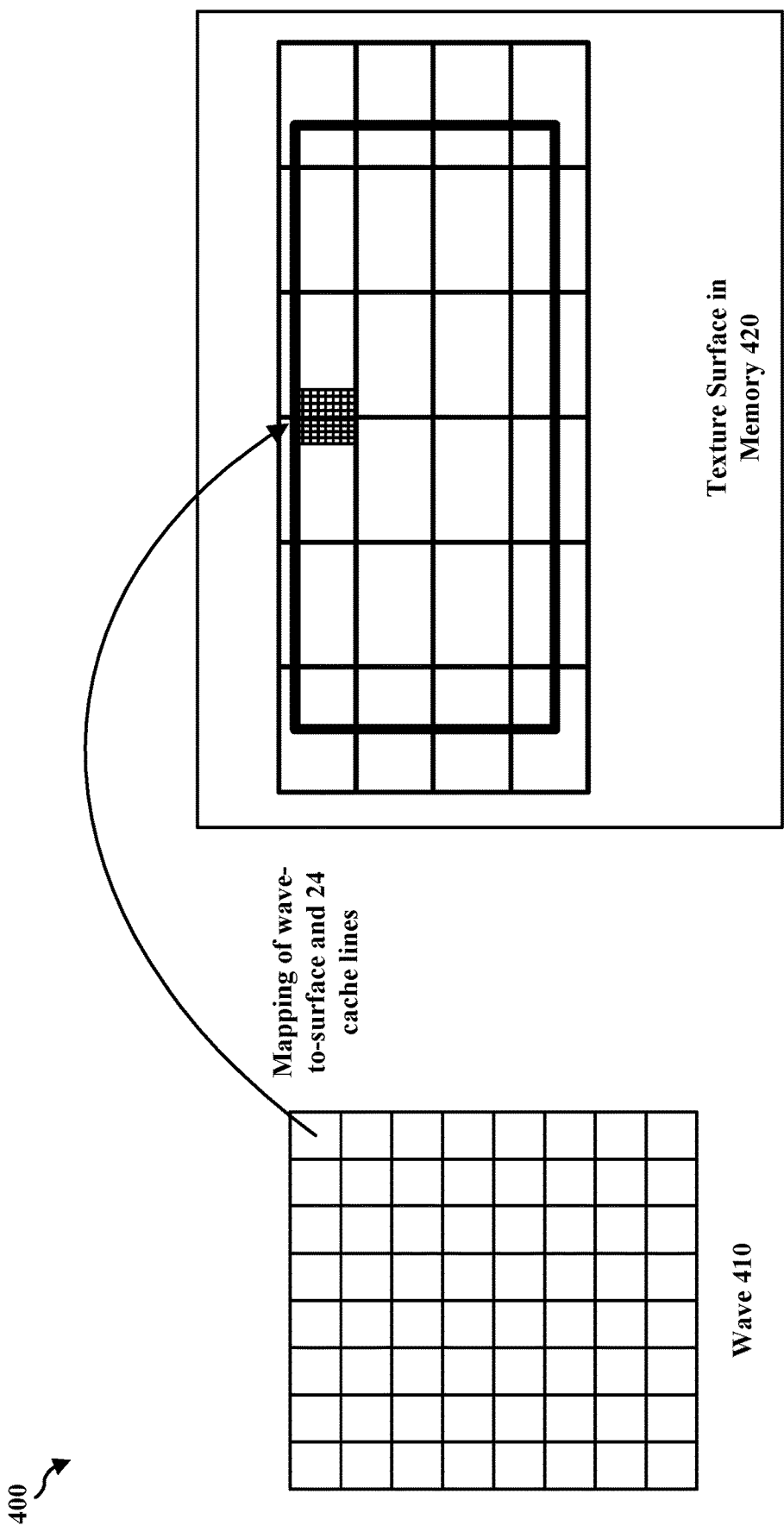
FIG. 4 is a diagram illustrating a mapping process for graphics processing in accordance with one or more techniques of this disclosure.

FIG. 4 is a diagram 400 illustrating a mapping process for graphics processing including mapping a wave to a texture surface in memory. As shown in FIG. 4, diagram 400 includes wave 410, e.g., a 64-pixel wave, and texture surface 420, e.g., corresponding to 24 cache lines. More specifically, FIG. 4 illustrates a mapping of wave 410 to texture surface 420 and 24 cache lines. FIG. 4 shows that there is locality between different instructions in the mapping operation, e.g., a filtering or downsampling operation. For example, a high definition texture may be converted to a standard definition screen resolution. FIG. 4 also shows that a cache may be capable of holding 16 lines, but the instruction from the wave may correspond to 24 cache lines.

As shown in FIG. 4, in the 64-pixel wave 410, each of the pixels may be fetching a 4×4 footprint. So the 64-pixel wave may be mapped into a 256×256 region. Each of the 24 individual blocks in texture surface 420 may correspond to a single cache line, and each of the 24 cache lines may hold 16 texture pixels or texels, where a single pixel may be mapped to 16 texels. As such, the texels may correspond to information stored in a texture cache and this information may be utilized to shade pixels. In some instances, a cache may not be able to hold all of the texture pixels or texels for each of the cache lines, so the first lines written to the cache may be overwritten by subsequent cache lines. As shown in FIG. 4, a cache may be capable of holding 16 lines, but the instruction may correspond to 24 cache lines. So when fetching the 17th cache line, the first cache line may be overwritten or discarded. Accordingly, when data for the first cache line is fetched, it may need to be fetched again from system memory, as it is no longer in the cache.

As shown in FIG. 4, certain types of shading or texture instructions may fetch data that utilizes a certain amount of cache lines. Ideally, the amount of cache lines used for a shading or texture instruction execution may be less than the size of a cache. However, the size of a corresponding cache may not be large enough to hold all of the fetched data for the shading or texture instruction, so previously fetched data may be overwritten. As such, the next instruction may not be able to utilize some of the data that was fetched by previous instructions. So data fetched by previous instructions to a cache may not be reused by subsequent instructions, which may result in the data being fetched from the system memory, rather than from the cache. Accordingly, subsequent instructions may not be able to utilize previously fetched data.

As indicated above, there are some situations where fully executing one texture fetch operation followed by another texture fetch operation may result in overwritten data, e.g., post-processing filtering operations. In these cases, MIP maps may not be used and the neighboring pixels may be spread out in texture space. Also, sequential texture fetch instructions within a single pixel may be more localized than between pixels. Executing the full wave for a single texture fetch instruction may lead to inefficient texture cache usage and cache thrashing, such as data for the following texture fetch instruction being overwritten by the current texture fetch instruction. For example, if there are 16 texture fetches into a texture cache line, a single texture fetch may be utilized, as a neighboring texture pixel may not be able to use the other texture fetches. So the neighboring texture pixel may be forced to fetch its own texture cache line. Accordingly, there may be a high amount of reuse between texture instructions, but not a lot of reuse within a texture instruction.

Based on the above, it may be beneficial to execute a portion of a texture fetch operation prior to executing the entire texture fetch operation. It may also be beneficial to provide an efficient texture cache usage and reduce the amount of cache misses or cache thrashing. Additionally, it may be beneficial for subsequent texture instructions to be able to utilize previously fetched data at a cache, such as without the need to fetch the data from a system memory. For instance, it may be beneficial to provide a mechanism across multiple texture fetch instructions that works on a portion of a wave during each loop iteration.

Aspects of the present disclosure may execute a portion of a texture fetch operation prior to executing the entire texture fetch operation. By doing so, aspects of the present disclosure may more efficiently utilize MIP maps and neighboring pixels may not be spread out in texture space. Aspects of the present disclosure may also provide an efficient texture cache usage and reduce the amount of cache misses or cache thrashing. Further, aspects of the present disclosure may allow subsequent texture instructions to utilize previously fetched data at a cache, such as without the need to fetch the data from a system memory. As such, aspects of the present disclosure may reduce or mitigate the amount of times certain data, e.g., texture data, is fetched from system memory, i.e., even with a small cache size. Moreover, aspects of the present disclosure may provide a looping mechanism across multiple texture fetch instructions that work on a portion of a wave during each loop iteration. Accordingly, aspects of the present disclosure may utilize hardware-assisted texture looping that is controlled by a compiler or a graphics shader.

In aspects of the present disclosure, a hardware looping mechanism may be utilized across multiple texture fetch instructions. This hardware looping mechanism may work on a portion of a wave of pixels during each loop iteration. By doing so, this may allow a pixel locality, i.e., a within-pixel locality, to be fully utilized. Further, the pixel locality may be fully utilized with any size of texture cache, e.g., a small texture cache.

In some instances, the decision as to whether to perform an intra-wave loop can be made by a compiler. In order to do so, the compiler may detect whether sequential texture fetch instructions are directed to the same surface. In some aspects, the intra-wave loop operation may be an optimization and functionality may be maintained whether or not the new texture loop instruction is utilized. Additionally, the functionality of the intra-wave loop operation may be maintained whether or not it is implemented in any particular piece of hardware.

As indicated above, aspects of the present disclosure may utilize an intra-wave texture looping operation, e.g., compiler-controlled intra-wave texture looping hardware. For instance, aspects of the present disclosure may have a compiler determine whether successive texture instructions correspond to the same texture surface. If successive texture instructions correspond to the same texture surface, the compiler may insert a texture loop marker, e.g., Tex_Loop marker, at this location. This texture loop marker may indicate a length of the intra-wave loop for same-surface accesses. The hardware may then loop within a sub-wave, which may ease the burden on the local cache. By doing so, aspects of the present disclosure may reduce the cache footprint and increase the amount of cache hits, i.e., if entire region does not fit in the size of the cache.

In one example, aspects of the present disclosure may utilize a texture loop along with a certain amount of texture fetch instructions. For example, aspects of the present disclosure may utilize the following operations: (0) Tex_Loop 16; (1) Texture_Fetch R0.xyzw←Texture(i1,j1,Tex1); (2)

Texture_Fetch R1.xyzw←Texture (i1+1,j1,Tex1); . . . (16)
Texture Fetch R15.xyzw←Texture(i1+3,j1+3,Tex1). In some instances, the texture loop, e.g., Tex_Loop 16, may be a new instruction.

Figure 5:
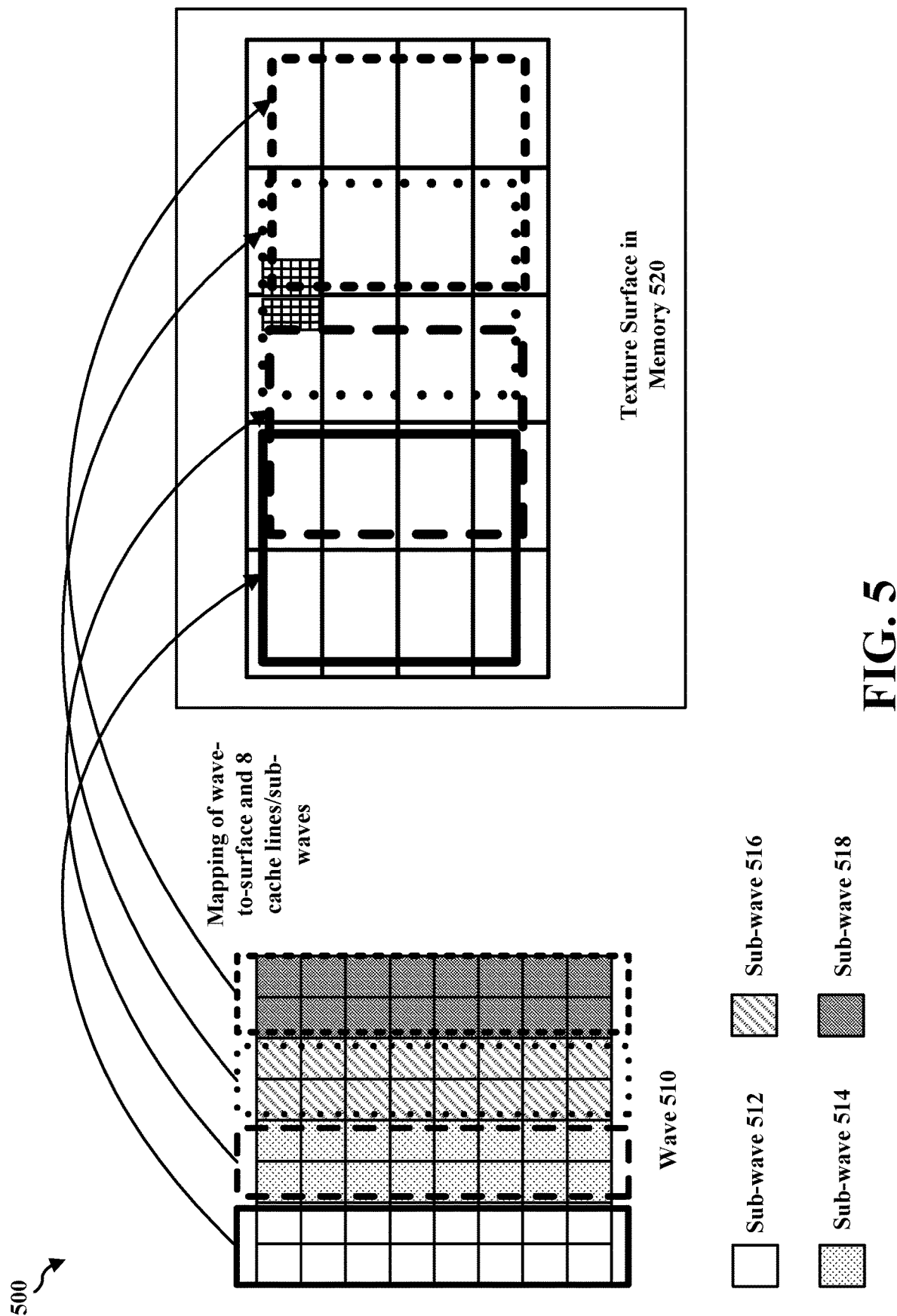
FIG. 5 is a diagram illustrating a mapping process for graphics processing in accordance with one or more techniques of this disclosure.

FIG. 5 is a diagram 500 illustrating a mapping process for graphics processing in accordance with one or more techniques of this disclosure, which includes mapping a wave to a texture surface in memory. As shown in FIG. 5, diagram 500 includes wave 510, e.g., a 64-pixel wave with four different 16-pixel sub-waves. For example, wave 510 includes sub-waves 512, 514, 516, 518, each of which is 16 pixels. Diagram 500 also includes texture surface 520, e.g., corresponding to eight (8) cache lines. FIG. 5 illustrates a mapping of wave 510 (including sub-waves 512, 514, 516, 518) to texture surface 520 and eight cache lines or sub-waves. Each of the sub-waves 512, 514, 516, 518 may be individually mapped to texture surface 520.

As shown in FIG. 5, aspects of the present disclosure may divide a wave of pixels, e.g., wave 510 including 64 pixels, into multiple sub-waves of pixels, e.g., sub-waves 512, 514, 516, 518 including 16 pixels each. As such, footprint of the 16 pixels for each sub-wave is smaller than the footprint of the 64 pixels for the wave 510. The instructions may then be executed for each of the sub-waves of pixels. So the instructions are not executed for the entire wave, as the cache size may be too small to store data for the entire wave of pixels. However, as the size of the pixel wave is reduced, i.e., divided into sub-waves of 16 pixels, the amount of cache lines may fit the size of each sub-wave. As shown in FIG. 5, the eight (8) cache lines may be fetched and then the 16 instructions may be processed without overwriting any of the data fetched by previous instructions. By doing so, subsequent instructions for the sub-wave may not need to fetch any data from system memory, as all of the data for the instructions is stored in the cache without any overwriting. Accordingly, each of the subsequent instructions may receive the full benefit of the cache.

FIG. 5 illustrates that instructions for each sub-wave, e.g., sub-wave 512, may fit into the size of the cache. Accordingly, subsequent instructions for the sub-wave 512 may not need to fetch any data from system memory, as all of the data for the instructions for sub-wave 512 is stored in the cache without any overwriting. Thus, each of the subsequent instructions for sub-wave 512 may receive the full benefit of the cache. Once the texels or data for sub-wave 512 is stored in the cache and the subsequent instructions are processed, then the next sub-wave, e.g., sub-wave 514, can be processed. This process can continue with the pixels for sub-wave 516 and sub-wave 518 until all of the instructions for each of the sub-waves have been processed. Accordingly, dividing the wave into sub-waves may allow smaller caches to be utilized with the benefit of instruction reuse, which otherwise may not be possible if the entire wave was processed at once. As such, dividing a wave of pixels or threads into sub-waves may result in the ability of smaller caches to provide for cache reuse between successive instructions.

Aspects of the present disclosure can determine whether an amount of data needed to execute a specific instruction, e.g., a subsection of the shader program, may be larger than a size of a cache. Additionally, aspects of the present disclosure may determine whether to divide a wave of pixels into multiple sub-waves of pixels. If so, aspects of the present disclosure may divide a wave of pixels, i.e., a group of threads, into multiple sub-waves of pixels, i.e., a plurality of sub-groups of threads. After this, aspects of the present disclosure may execute the specific instruction, e.g., a subsection of the shader program.

Moreover, aspects of the present disclosure may determine whether a group of texture fetches correspond to a same texture surface. For instance, a compiler may recognize when a group of texture fetches correspond to a same surface. If a group of texture fetches correspond to a same texture surface, there may be locality between the texture instructions for a specific pixel. As such, there may be a high likelihood of reusing data stored in a cache between successive instructions. This may be a good indication that a wave of pixels should be divided into sub-waves of pixels, such that a memory footprint of a subsection of the shader program for the instructions may not exceed the size of the cache.

Some aspects of the present disclosure may provide a compiler-generated sub-wave operation that utilizes hardware assistance. So a compiler may determine whether sub-wave operations would be beneficial, i.e., sub-wave operations may decrease the amount of power utilized at the GPU or increase the performance of the GPU. Accordingly, a compiler may determine whether successive texture instructions correspond to a same texture surface. If so, the compiler may utilize texture loop hardware which can allow it to execute sub-wave operations across multiple texture instructions. As such, if the compiler determines that successive texture instructions correspond to a same texture surface, the compiler may execute a subsection of the shader program for the multiple texture instructions. Additionally, upon determining that successive texture instructions correspond to a same texture surface, aspects of the present disclosure may insert a texture loop marker. By doing so, hardware may detect that a sub-wave mode should be initiated for the next group of instructions.

There may be a number of benefits or advantages to utilizing the aforementioned looping mechanisms across multiple texture fetch instructions. In one example, e.g., a 4×4 downsample post-processing, there may be a certain amount of performance benefit or power reduction, e.g., 50% performance benefit or power reduction. Further, the amount of texture cache misses may be decreased by a certain factor, e.g., a factor of eight (8). Also, these looping mechanisms may be utilized with software operations in addition to hardware operations. Further, aspects of the present disclosure may reduce a cache footprint and increase the amount of cache hits.

Figure 6:
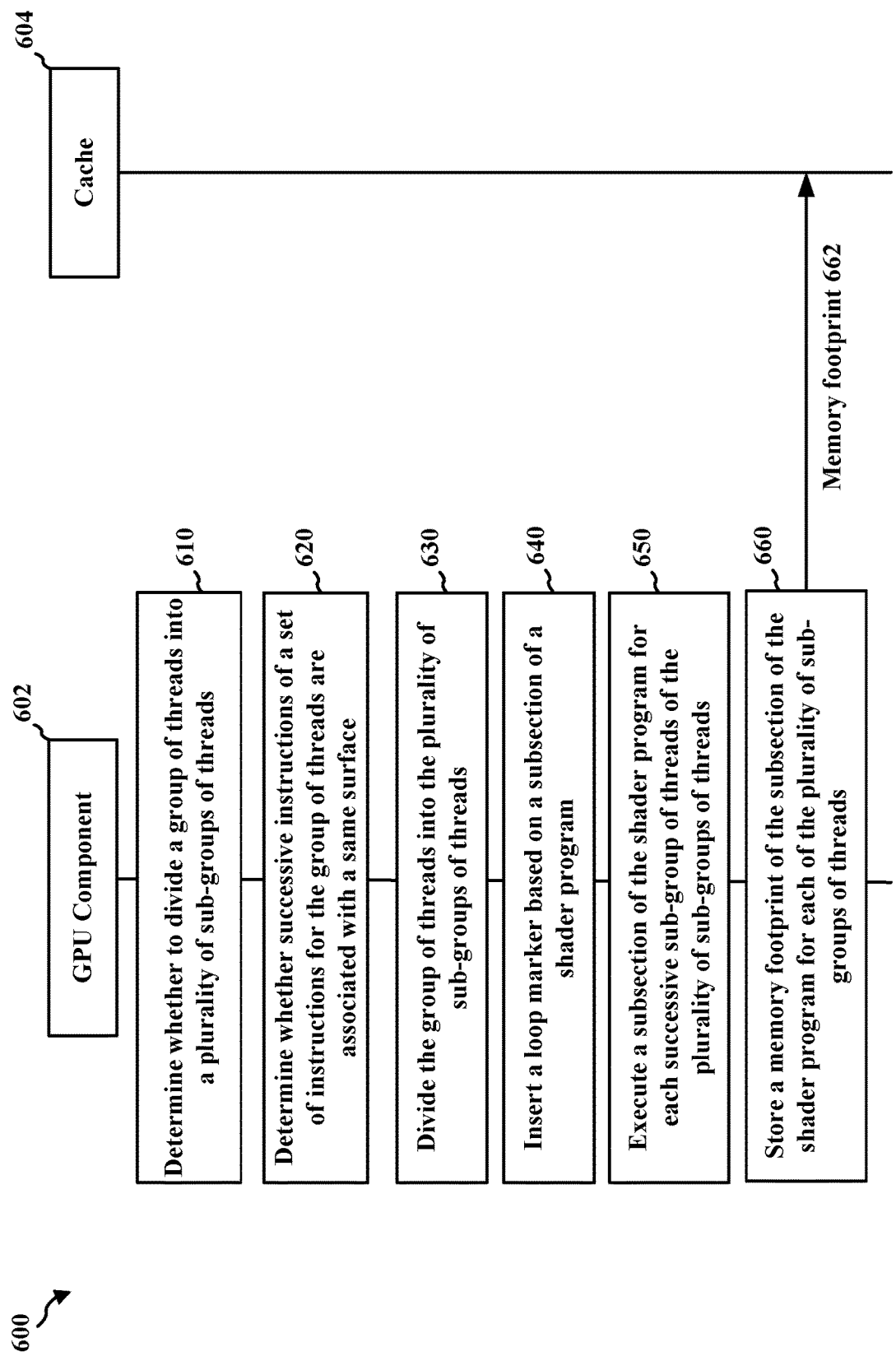
FIG. 6 is a communication flow diagram illustrating example communications between a GPU component and a cache in accordance with one or more techniques of this disclosure.

FIG. 6 is a communication flow diagram 600 of graphics processing in accordance with one or more techniques of this disclosure. As shown in FIG. 6, diagram 600 includes example communications between GPU component 602, e.g., a graphics shader or a compiler, and cache 604, e.g., a texture cache at a GPU, in accordance with one or more techniques of this disclosure.

At 610, GPU component 602 may determine whether to divide a group of threads, e.g., wave 510, into a plurality of sub-groups of threads, e.g., sub-waves 512, 514, 516, 518, each thread of the group of threads being associated with a shader program. In some aspects, the group of threads may be a wave of threads, e.g., wave 510, and the plurality of sub-groups of threads may be a plurality of sub-waves of threads, e.g., sub-waves 512, 514, 516, 518. The group of threads may be at least one of a group of pixels, e.g., wave 510, a group of vertices, or a group of work items. Also, the group of pixels, e.g., wave 510, may be a group of texture pixels or a group of texels. The determination whether to divide the group of threads into the plurality of sub-groups of threads may be performed by a compiler.

At 620, GPU component 602 may determine whether successive instructions of a set of instructions for the group of threads, e.g., wave 510, are associated with a same surface. The set of instructions may be texture instructions and the same surface may be a texture surface. Moreover, the set of instructions may correspond to downsampling instructions.

At 630, GPU component 602 may divide, upon determining to divide the group of threads into the plurality of sub-groups of threads, the group of threads, e.g., wave 510, into the plurality of sub-groups of threads, e.g., sub-waves 512, 514, 516, 518.

At 640, GPU component 602 may insert a loop marker for each of the plurality of sub-groups of threads, e.g., sub-waves 512, 514, 516, 518, based on the subsection of the shader program. The loop marker may define a range of the subsection of the shader program. The range may include a start of the subsection of the shader program and an end of the subsection of the shader program. Further, the loop marker may be associated with an initiation mechanism or a hardware initiation mechanism.

At 650, GPU component 602 may execute, upon dividing the group of threads into the plurality of sub-groups of threads, a subsection of the shader program for each sub-group of threads of the plurality of sub-groups of threads, e.g., sub-waves 512, 514, 516, 518, where the subsection of the shader program may complete execution for one sub-group of threads before commencing execution for a subsequent sub-group of threads. The subsection of the shader program for each of the plurality of sub-groups of threads, e.g., sub-waves 512, 514, 516, 518, may be executed by a graphics shader in a graphics processing unit (GPU).

In some aspects, a memory footprint 662 of the subsection of the shader program for each of the plurality of sub-groups of threads, e.g., sub-waves 512, 514, 516, 518, may be associated with a size of a cache, e.g., cache 604. The memory footprint of all of the subsections of the shader program for the group of threads, e.g., sub-waves 512, 514, 516, 518, may exceed the size of the cache, e.g., cache 604. Also, the cache, e.g., cache 604, may be a texture cache or a level 1 (L1) texture cache.

At 660, GPU component 602 may store, in the cache 604, the memory footprint 662 of the subsection of the shader program for each of the plurality of sub-groups of threads, e.g., sub-waves 512, 514, 516, 518.

Figure 7:
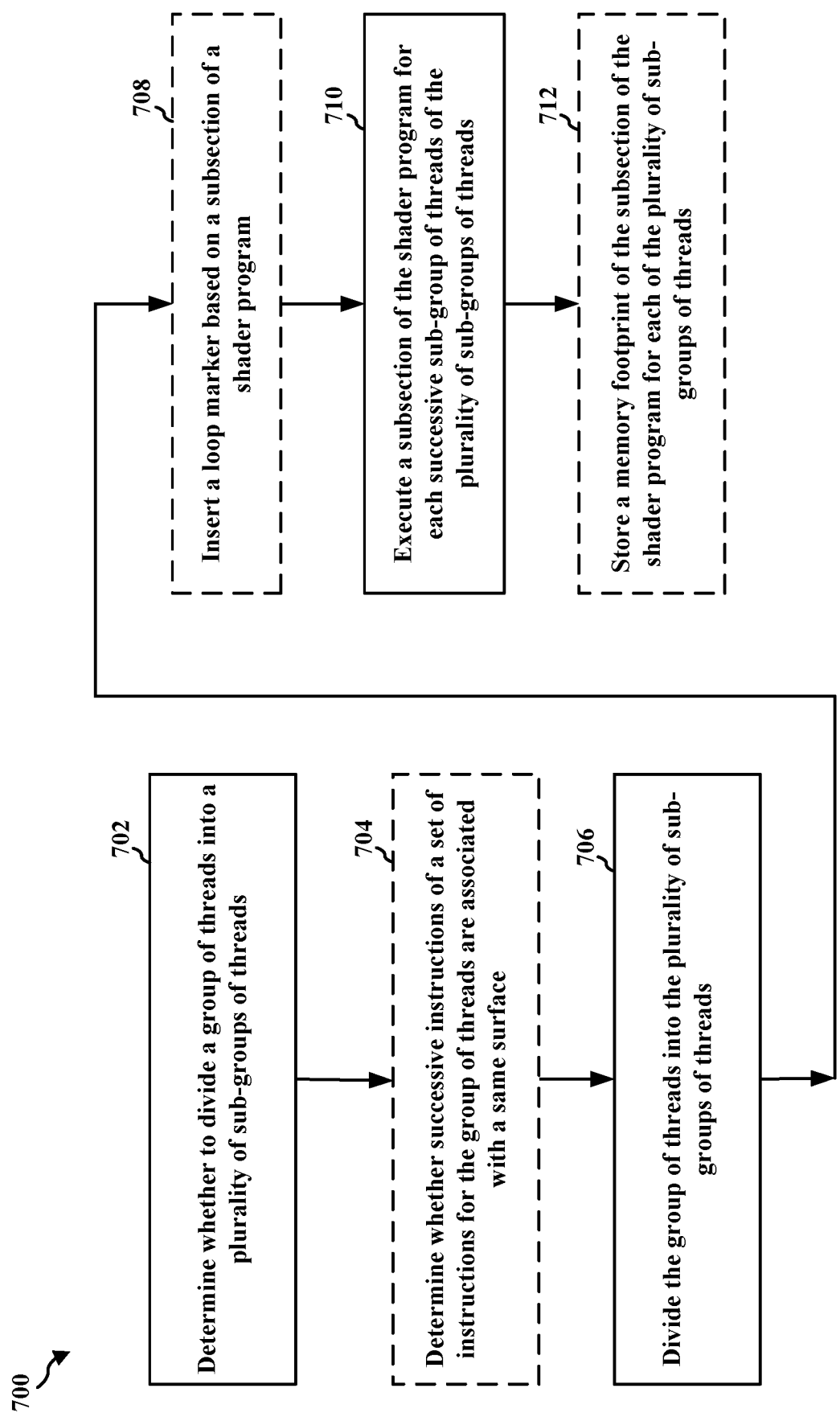
FIG. 7 is a flowchart of an example method of graphics processing in accordance with one or more techniques of this disclosure.

FIG. 7 is a flowchart 700 of an example method of graphics processing in accordance with one or more techniques of this disclosure. The method may be performed by an apparatus, such as an apparatus for graphics processing, a GPU or other graphics processor, a graphics shader, a compiler, a GPU pipeline, a wireless communication device, and/or any apparatus that can perform graphics processing as used in connection with the examples of FIGS. 1-6.

At 702, the apparatus may determine whether to divide a group of threads into a plurality of sub-groups of threads, each thread of the group of threads being associated with a shader program, as described in connection with the examples in FIGS. 1-6. For example, GPU component 602 may determine whether to divide a group of threads into a plurality of sub-groups of threads, each thread of the group of threads being associated with a shader program. Further, processing unit 120 may perform 702.

In some aspects, the group of threads may be a wave of threads and the plurality of sub-groups of threads may be a plurality of sub-waves of threads, as described in connection with the examples in FIGS. 1-6. The group of threads may be at least one of a group of pixels, a group of vertices, or a group of work items, as described in connection with the examples in FIGS. 1-6. Also, the group of pixels may be a group of texture pixels or a group of texels, as described in connection with the examples in FIGS. 1-6. The determination whether to divide the group of threads into the plurality of sub-groups of threads may be performed by a compiler, as described in connection with the examples in FIGS. 1-6.

At 704, the apparatus may determine whether successive instructions of a set of instructions for the group of threads are associated with a same surface, as described in connection with the examples in FIGS. 1-6. For example, GPU component 602 may determine whether successive instructions of a set of instructions for the group of threads are associated with a same surface. Further, processing unit 120 may perform 704. The set of instructions may be texture instructions and the same surface may be a texture surface, as described in connection with the examples in FIGS. 1-6. Moreover, the set of instructions may correspond to downsampling instructions, as described in connection with the examples in FIGS. 1-6.

At 706, the apparatus may divide, upon determining to divide the group of threads into the plurality of sub-groups of threads, the group of threads into the plurality of sub-groups of threads, as described in connection with the examples in FIGS. 1-6. For example, GPU component 602 may divide, upon determining to divide the group of threads into the plurality of sub-groups of threads, the group of threads into the plurality of sub-groups of threads. Further, processing unit 120 may perform 706.

At 708, the apparatus may insert a loop marker for each of the plurality of sub-groups of threads based on the subsection of the shader program, as described in connection with the examples in FIGS. 1-6. For example, GPU component 602 may insert a loop marker for each of the plurality of sub-groups of threads based on the subsection of the shader program. Further, processing unit 120 may perform 708. The loop marker may define a range of the subsection of the shader program, as described in connection with the examples in FIGS. 1-6. The range may include a start of the subsection of the shader program and an end of the subsection of the shader program, as described in connection with the examples in FIGS. 1-6. Further, the loop marker may be associated with an initiation mechanism or a hardware initiation mechanism, as described in connection with the examples in FIGS. 1-6.

At 710, the apparatus may execute, upon dividing the group of threads into the plurality of sub-groups of threads, a subsection of the shader program for each sub-group of threads of the plurality of sub-groups of threads, where the subsection of the shader program may complete execution for one sub-group of threads before commencing execution for a subsequent sub-group of threads, as described in connection with the examples in FIGS. 1-6. For example, GPU component 602 may execute, upon dividing the group of threads into the plurality of sub-groups of threads, a subsection of the shader program for each sub-group of threads of the plurality of sub-groups of threads. Further, processing unit 120 may perform 710. The subsection of the shader program for each of the plurality of sub-groups of threads may be executed by a graphics shader in a graphics processing unit (GPU), as described in connection with the examples in FIGS. 1-6.

In some aspects, a memory footprint of the subsection of the shader program for each of the plurality of sub-groups of threads may be associated with a size of a cache, as described in connection with the examples in FIGS. 1-6. The memory footprint of all of the subsections of the shader program for the group of threads may exceed the size of the cache, as described in connection with the examples in FIGS. 1-6. Also, the cache may be a texture cache or a level 1 (L1) texture cache, as described in connection with the examples in FIGS. 1-6.

At 712, the apparatus may store, in the cache, the memory footprint of the subsection of the shader program for each of the plurality of sub-groups of threads, as described in connection with the examples in FIGS. 1-6. For example, GPU component 602 may store, in the cache, the memory footprint of the subsection of the shader program for each of the plurality of sub-groups of threads. Further, processing unit 120 may perform 712.

In configurations, a method or an apparatus for graphics processing is provided. The apparatus may be a GPU, a graphics processor, a graphics shader, a compiler, or some other processor that may perform graphics processing. In aspects, the apparatus may be the processing unit 120 within the device 104, or may be some other hardware within the device 104 or another device. The apparatus may include means for determining whether to divide a group of threads into a plurality of sub-groups of threads, each thread of the group of threads being associated with a shader program. The apparatus may further include means for dividing, upon determining to divide the group of threads into the plurality of sub-groups of threads, the group of threads into the plurality of sub-groups of threads. The apparatus may further include means for executing, upon dividing the group of threads into the plurality of sub-groups of threads, a sub-section of the shader program for each sub-group of threads of the plurality of sub-groups of threads. The apparatus may further include means for inserting a loop marker for each of the plurality of sub-groups of threads based on the subsection of the shader program. The apparatus may further include means for determining whether successive instructions of a set of instructions for the group of threads are associated with a same surface. The apparatus may further include means for storing, in the cache, the memory footprint of the subsection of the shader program for each of the plurality of sub-groups of threads.

The subject matter described herein can be implemented to realize one or more benefits or advantages. For instance, the described graphics processing techniques can be used by a GPU, a graphics processor, a graphics shader, a compiler, or some other processor that can perform graphics processing to implement the intra-wave texture looping techniques described herein. This can also be accomplished at a low cost compared to other graphics processing techniques. Moreover, the graphics processing techniques herein can improve or speed up data processing or execution. Further, the graphics processing techniques herein can improve resource or data utilization and/or resource efficiency. Additionally, aspects of the present disclosure can utilize intra-wave texture looping in order to improve memory bandwidth and/or reduce performance overhead at a GPU.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects.

Unless specifically stated otherwise, the term "some" refers to one or more and the term "or" may be interpreted as "and/or" where context does not dictate otherwise. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium.

In accordance with this disclosure, the term "or" may be interrupted as "and/or" where context does not dictate otherwise. Additionally, while phrases such as "one or more" or "at least one" or the like may have been used for some features disclosed herein but not others, the features for which such language was not used may be interpreted to have such a meaning implied where context does not dictate otherwise.

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium. Computer-readable media may include computer data storage media or communication media including any medium that facilitates transfer of a computer program from one place to another. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage or other magnetic storage devices. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. A computer program product may include a computer-readable medium.

The code may be executed by one or more processors, such as one or more digital signal processors (DSPs), general purpose microprocessors, application specific integrated circuits (ASICs), arithmetic logic units (ALUs), field programmable logic arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs, e.g., a chip set. Various components, modules or units are described in this disclosure to emphasize functional aspects of devices configured to perform the disclosed techniques, but do not necessarily need realization by different hardware units. Rather, as described above, various units may be combined in any hardware unit or provided by a collection of inter-operative hardware units, including one or more processors as described above, in conjunction with suitable software and/or firmware. Accordingly, the term "processor," as used herein may refer to any of the foregoing structure or any other structure suitable for implementation of the techniques described herein. Also, the techniques may be fully implemented in one or more circuits or logic elements.

The following aspects are illustrative only and may be combined with other aspects or teachings described herein, without limitation.

Aspect 1 is a method of graphics processing. The method includes determining whether to divide a group of threads into a plurality of sub-groups of threads, each thread of the group of threads being associated with a shader program; dividing, upon determining to divide the group of threads into the plurality of sub-groups of threads, the group of threads into the plurality of sub-groups of threads; and executing, upon dividing the group of threads into the plurality of sub-groups of threads, a subsection of the shader program for each sub-group of threads of the plurality of sub-groups of threads, the subsection of the shader program completing execution for one sub-group of threads before commencing execution for a subsequent sub-group of threads.

Aspect 2 is the method of aspect 1, where the group of threads is a wave of threads and the plurality of sub-groups of threads is a plurality of sub-waves of threads.

Aspect 3 is the method of any of aspects 1 and 2, where the group of threads is at least one of a group of pixels, a group of vertices, or a group of work items.

Aspect 4 is the method of any of aspects 1 to 3, where the group of pixels is a group of texture pixels or a group of texels.

Aspect 5 is the method of any of aspects 1 to 4, further including inserting a loop marker for each of the plurality of sub-groups of threads based on the subsection of the shader program.

Aspect 6 is the method of any of aspects 1 to 5, where the loop marker defines a range of the subsection of the shader program.

Aspect 7 is the method of any of aspects 1 to 6, where the range includes a start of the subsection of the shader program and an end of the subsection of the shader program.

Aspect 8 is the method of any of aspects 1 to 7, where the loop marker is associated with an initiation mechanism or a hardware initiation mechanism.

Aspect 9 is the method of any of aspects 1 to 8, further including determining whether successive instructions of a set of instructions for the group of threads are associated with a same surface.

Aspect 10 is the method of any of aspects 1 to 9, where the set of instructions are texture instructions and the same surface is a texture surface.

Aspect 11 is the method of any of aspects 1 to 10, where the set of instructions correspond to downsampling instructions.

Aspect 12 is the method of any of aspects 1 to 11, where a memory footprint of the subsection of the shader program for each of the plurality of sub-groups of threads is associated with a size of a cache.

Aspect 13 is the method of any of aspects 1 to 12, where the memory footprint of all of the subsections of the shader program for the group of threads exceeds the size of the cache.

Aspect 14 is the method of any of aspects 1 to 13, further including storing, in the cache, the memory footprint of the subsection of the shader program for each of the plurality of sub-groups of threads.

Aspect 15 is the method of any of aspects 1 to 14, where the cache is a texture cache or a level 1 (L1) texture cache.

Aspect 16 is the method of any of aspects 1 to 15, where the determination whether to divide the group of threads into the plurality of sub-groups of threads is performed by a compiler.

Aspect 17 is the method of any of aspects 1 to 16, where the subsection of the shader program for each of the plurality of sub-groups of threads is executed by a graphics shader in a graphics processing unit (GPU).

Aspect 18 is an apparatus for graphics processing including at least one processor coupled to a memory and configured to implement a method as in any of aspects 1 to 17.

Aspect 19 is an apparatus for graphics processing including means for implementing a method as in any of aspects 1 to 17.

Aspect 20 is a computer-readable medium storing computer executable code, the code when executed by at least one processor causes the at least one processor to implement a method as in any of aspects 1 to 17.

What is claimed is:

1. A method of graphics processing, comprising:
   determining whether to divide a group of threads into a plurality of sub-groups of threads, each thread of the group of threads being associated with a shader program;
   dividing, based on determining to divide the group of threads into the plurality of sub-groups of threads, the group of threads into the plurality of sub-groups of threads;
   inserting a loop marker for each of the plurality of sub-groups of threads based on a subsection of the shader program, wherein the loop marker is a texture loop marker associated with texture instructions, wherein the texture loop marker is inserted based on successive texture instructions for the group of threads being associated with a same texture surface, wherein the texture loop marker indicates a length of an intra-wave loop for same-surface accesses; and
   executing, based on dividing the group of threads into the plurality of sub-groups of threads, the subsection of the shader program for each sub-group of threads of the plurality of sub-groups of threads, the subsection of the shader program completing execution for one sub-group of threads before commencing execution for a subsequent sub-group of threads.

2. The method of claim 1, wherein the group of threads is a wave of threads and the plurality of sub-groups of threads is a plurality of sub-waves of threads.

3. The method of claim 1, wherein the group of threads is at least one of a group of pixels, a group of vertices, or a group of work items.

4. The method of claim 3, wherein the group of pixels is a group of texture pixels.

5. The method of claim 1, wherein the loop marker defines a range of the subsection of the shader program.

6. The method of claim 5, wherein the range includes a start of the subsection of the shader program and an end of the subsection of the shader program.

7. The method of claim 1, wherein the loop marker is associated with an initiation mechanism.

8. The method of claim 1, further comprising:
   determining whether successive instructions of a set of instructions for the group of threads are associated with the same texture surface.

9. The method of claim 8, wherein the set of instructions is the texture instructions.

10. The method of claim 8, wherein the set of instructions correspond to downsampling instructions.

11. The method of claim 1, wherein a memory footprint of the subsection of the shader program for each of the plurality of sub-groups of threads is associated with a size of a cache.

12. The method of claim 11, wherein the memory footprint of all subsections of the shader program for the group of threads exceeds the size of the cache.

13. The method of claim 11, further comprising:
   storing, in the cache, the memory footprint of the subsection of the shader program for each of the plurality of sub-groups of threads.

14. The method of claim 11, wherein the cache is a texture cache.

15. The method of claim 1, wherein the determination whether to divide the group of threads into the plurality of sub-groups of threads is performed by a compiler.

16. The method of claim 1, wherein the subsection of the shader program for each of the plurality of sub-groups of threads is executed by a graphics shader in a graphics processing unit (GPU).

17. An apparatus for graphics processing, comprising:
   a memory; and
   at least one processor coupled to the memory and configured to:
      determine whether to divide a group of threads into a plurality of sub-groups of threads, each thread of the group of threads being associated with a shader program;
      divide, based on determining to divide the group of threads into the plurality of sub-groups of threads, the group of threads into the plurality of sub-groups of threads;
      insert a loop marker for each of the plurality of sub-groups of threads based on a subsection of the shader program, wherein the loop marker is a texture loop marker associated with texture instructions, wherein the at least one processor is configured to insert the texture loop marker based on successive texture instructions for the group of threads being associated with a same texture surface, wherein the texture loop marker indicates a length of an intra-wave loop for same-surface accesses; and
      execute, based on dividing the group of threads into the plurality of sub-groups of threads, the subsection of the shader program for each sub-group of threads of the plurality of sub-groups of threads, the subsection of the shader program completing execution for one sub-group of threads before commencing execution for a subsequent sub-group of threads.

18. The apparatus of claim 17, wherein the group of threads is a wave of threads and the plurality of sub-groups of threads is a plurality of sub-waves of threads.

19. The apparatus of claim 17, wherein the group of threads is at least one of a group of pixels, a group of vertices, or a group of work items.

20. The apparatus of claim 19, wherein the group of pixels is a group of texture pixels.

21. The apparatus of claim 17, wherein the loop marker defines a range of the subsection of the shader program.

22. The apparatus of claim 21, wherein the range includes a start of the subsection of the shader program and an end of the subsection of the shader program.

23. The apparatus of claim 17, wherein the loop marker is associated with an initiation mechanism.

24. The apparatus of claim 17, wherein the at least one processor is further configured to:
   determine whether successive instructions of a set of instructions for the group of threads are associated with the same texture surface.

25. The apparatus of claim 24, wherein the set of instructions is the texture instructions.

26. The apparatus of claim 24, wherein the set of instructions correspond to downsampling instructions.

27. The apparatus of claim 17, wherein a memory footprint of the subsection of the shader program for each of the plurality of sub-groups of threads is associated with a size of a cache.

28. The apparatus of claim 27, wherein the memory footprint of all subsections of the shader program for the group of threads exceeds the size of the cache.

29. The apparatus of claim 27, wherein the at least one processor is further configured to:

store, in the cache, the memory footprint of the subsection of the shader program for each of the plurality of sub-groups of threads.

30. The apparatus of claim 27, wherein the cache is a texture cache.

31. The apparatus of claim 17, wherein the determination whether to divide the group of threads into the plurality of sub-groups of threads is configured to be performed by a compiler.

32. The apparatus of claim 17, wherein the at least one processor is configured to execute the subsection of the shader program for each of the plurality of sub-groups of threads with a graphics shader in a graphics processing unit (GPU).

33. An apparatus for graphics processing, comprising:
 means for determining whether to divide a group of threads into a plurality of sub-groups of threads, each thread of the group of threads being associated with a shader program;
 means for dividing, based on determining to divide the group of threads into the plurality of sub-groups of threads, the group of threads into the plurality of sub-groups of threads;
 means for inserting a loop marker for each of the plurality of sub-groups of threads based on a subsection of the shader program, wherein the loop marker is a texture loop marker associated with texture instructions, wherein the texture loop marker is inserted based on successive texture instructions for the group of threads being associated with a same texture surface, wherein the texture loop marker indicates a length of an intra-wave loop for same-surface accesses; and
 means for executing, based on dividing the group of threads into the plurality of sub-groups of threads, the subsection of the shader program for each sub-group of threads of the plurality of sub-groups of threads, the subsection of the shader program completing execution for one sub-group of threads before commencing execution for a subsequent sub-group of threads.

34. A non-transitory computer-readable medium storing computer executable code for graphics processing, the code when executed by a processor causes the processor to:
 determine whether to divide a group of threads into a plurality of sub-groups of threads, each thread of the group of threads being associated with a shader program;
 divide, based on determining to divide the group of threads into the plurality of sub-groups of threads, the group of threads into the plurality of sub-groups of threads;
 insert a loop marker for each of the plurality of sub-groups of threads based on a subsection of the shader program, wherein the loop marker is a texture loop marker associated with texture instructions, wherein the texture loop marker is inserted based on successive texture instructions for the group of threads being associated with a same texture surface, wherein the texture loop marker indicates a length of an intra-wave loop for same-surface accesses; and
 execute, based on dividing the group of threads into the plurality of sub-groups of threads, the subsection of the shader program for each sub-group of threads of the plurality of sub-groups of threads, the subsection of the shader program completing execution for one sub-group of threads before commencing execution for a subsequent sub-group of threads.

* * * * *